US012586914B2

(12) United States Patent
Draaijer et al.

(10) Patent No.: US 12,586,914 B2
(45) Date of Patent: Mar. 24, 2026

(54) ANTENNA ARRANGEMENT

(71) Applicant: SIGNIFY HOLDING B.V., Eindhoven (NL)

(72) Inventors: Maurice Herman Johan Draaijer, Ittervoort (NL); Matthias Wendt, Würselen (DE); Bartel Marinus Van De Sluis, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 109 days.

(21) Appl. No.: 18/564,701

(22) PCT Filed: May 19, 2022

(86) PCT No.: PCT/EP2022/063602
§ 371 (c)(1),
(2) Date: Nov. 28, 2023

(87) PCT Pub. No.: WO2022/253583
PCT Pub. Date: Dec. 8, 2022

(65) Prior Publication Data
US 2024/0275063 A1 Aug. 15, 2024

(30) Foreign Application Priority Data
May 31, 2021 (EP) .................................... 21176800

(51) Int. Cl.
*H01Q 13/12* (2006.01)
*F21S 4/28* (2016.01)
(Continued)

(52) U.S. Cl.
CPC ................ *H01Q 13/12* (2013.01); *F21S 4/28* (2016.01); *F21Y 2115/10* (2016.08); *H01Q 1/06* (2013.01)

(58) Field of Classification Search
USPC .......................................................... 343/702
See application file for complete search history.

(56) References Cited

U.S. PATENT DOCUMENTS 8,628,255 B2 * 1/2014 Li ........................ A61B 1/0653 362/618
2015/0091763 A1 4/2015 Lo Hine Tong et al.
(Continued)

FOREIGN PATENT DOCUMENTS

DE 102019000259 A1 8/2019
EP 2629363 A1 8/2013
(Continued)

OTHER PUBLICATIONS

"14 Inch LED RGB Radio Antenna, Quake LED," https://quakeled.com/14-inch-led-rgb-radio-antenna-quake-led.html, Las Accessed Nov. 27, 2023 (4 Pages).

*Primary Examiner* — Crystal L Hammond
*Assistant Examiner* — Brandon Sean Woods

(57) ABSTRACT

An antenna arrangement is disclosed. The antenna arrangement comprises: an elongated pipe shaped electrically conductive body; a plurality of slots formed in the conductive body and arranged to act as an antenna array comprising a plurality of antenna elements, each antenna element comprising a slot, the plurality of antenna elements of the antenna array overall distributed along a longitudinal direction of the conductive body, and a feeding structure disposed within the conductive body, the feeding structure comprising a plurality of feeding elements each arranged to excite an antenna element of the antenna array.

16 Claims, 1 Drawing Sheet

(51) Int. Cl.
*F21Y 115/10* (2016.01)
*H01Q 1/06* (2006.01)

(56) References Cited

U.S. PATENT DOCUMENTS

| | | | | |
|---|---|---|---|---|
| 2018/0229428 | A1* | 8/2018 | Takano | B22F 12/10 |
| 2019/0229428 | A1 | 7/2019 | Beskov et al. | |
| 2020/0091579 | A1 | 3/2020 | Courtney et al. | |
| 2023/0397316 | A1* | 12/2023 | Lochmann | H05B 47/19 |

FOREIGN PATENT DOCUMENTS

| | | | | |
|---|---|---|---|---|
| EP | 2871708 | A1 * | 5/2015 | F21V 21/008 |
| JP | H01238305 | A | 9/1989 | |
| JP | H03173205 | A | 7/1991 | |
| WO | 2016066564 | A1 | 5/2016 | |
| WO | 2018103897 | A1 | 6/2018 | |
| WO | 2020234486 | A1 | 11/2020 | |
| WO | 2022207641 | A1 | 10/2022 | |
| WO | 2022214466 | A1 | 10/2022 | |

* cited by examiner

ANTENNA ARRANGEMENT

CROSS-REFERENCE TO PRIOR APPLICATIONS

This application is the U.S. National Phase application under 35 U.S.C. § 371 of International Application No. PCT/EP2022/063602, filed on May 19, 2022, which claims the benefit of European Patent Application No. 21176800.7, filed on May 31, 2021. These applications are hereby incorporated by reference herein.

TECHNICAL FIELD

The present disclosure generally relates to the field of telecommunication technologies, and more specifically, to an antenna arrangement for high density radio frequency, RF, networks.

BACKGROUND

Accompanying the evolvement of telecommunication technologies is the ever increasing demand for improved user experience, which in many cases is reflected by the increase in the desired bandwidth per user and the number of desired connections. At the same time, more freedom is required in terms of the deployment of network devices in relation to locations where the bandwidth is desired and consumed.

With the increase in screen sizes and increase in power consumption of mobile devices, the pressure to decrease power consumption for the increasing number of handheld devices increases as well. All these desires have an impact on the way of implementing the communication and communication infrastructure for these handheld devices.

Therefore, the density of telecommunication masts with antenna's increases over time because of many reasons:

- Bandwidth per user goes up because of content and improved devices;
- With every generation of communication technology the number of masts goes up from 2G to 3G to 4G and 5G, because it is desirable to increase the bandwidth per user;
- Energy consumption goes up as a function of distance, which means nearby cell towers increase battery life of consumer devices and cell tower far away decrease battery life of consumer devices;
- Close by cell towers decrease the "pollution" of "interference range" of electromagnetic, EM, spectrum which means frequency spectrum can be re-used more often by the network when cell towers are present in a higher density in public spaces.

Having more and more antenna masts for telecommunication applications (4G, 5G etc.) is a huge problem in terms of investment, permit requests and procedures. Moreover, people have increasingly resistance for having such a mast close by. More often it is not even possible to have such a mast at the ideal location.

For each of these locations at least power, space and permission is required to realize these communication masts. Furthermore, any new antenna mast increases cluttering of landscape and building roofs.

Against this background, an antenna structure comprising a linear antenna array was designed with an aim of allowing more flexibility in the deployment of antennas. Antenna elements of the linear antenna array are disposed on a flexible supporting structure, allowing distributed antennas at nearly any place without cluttering of roofs or facades.

However, the flexible structure of the linear antenna array makes its applications limited as additional carrier structures may be required for free outdoor hanging, thereby providing pull forces as required for cables to be mounted over extended distances and also to seal against environmental influences.

Therefore, there is a genuine need for an improved antenna arrangement which maintains similar level of flexibility and is more robust and mechanically stronger, allowing the application scenarios to be more diverse and reliable.

US2019229428A1 relates to a slot antenna for a cellular communications system.

EP2871708A1 relates to a communication cable for homogeneous distribution of data signals comprises a leaky feeder structure with a core conductor, an insulation shield surrounding the core conductor, an outer conductor around the insulation shield with a plurality of apertures along its length and a jacket at least partly covering the outer conductor. An illumination arrangement is arranged at least along sections of the length of the cable.

WO2016066564A1 relates to a wireless LED tube lamp device comprises: an at least partially transparent tube; at least one LED arranged within said tube; at least one LED driver; a LED controller; an RF antenna coupled to the controller for receiving and sending wireless commands.

SUMMARY

In an aspect of the present disclosure, there is presented an antenna arrangement comprising:

- an elongated pipe shaped electrically conductive body;
- a plurality of slots formed in the conductive body and arranged to act as an antenna array comprising a plurality of antenna elements, each antenna element comprising a slot, the plurality of antenna elements of the antenna array overall distributed along a longitudinal direction of the conductive body, and
- a feeding structure disposed within the conductive body, the feeding structure comprising a plurality of feeding elements each arranged to excite an antenna element of the antenna array.

The present disclosure is based on the insight that slots formed in a pipe shaped electrically conductive body, such as a metal pipe, can function or act as antenna elements, when the slots are excited by electric signals. Therefore, an elongated pipe shaped electrically conductive body with a plurality of slots excited by a feeding structure disposed inside the conductive body provides a convenient and effective alternative to the flexible linear antenna array as described in the background. The excited slots form a slot antenna array, which can create an electromagnetic, EM, field or a combination of electromagnetic fields resulting in an EM field front, optimized for multiple-input and multiple-output, MIMO, antennas. The antenna arrangement comprises at least one additional device disposed on the feeding structure, which is a lighting device for illumination.

The electrically conductive pipe with slots can generate a nice and defined antenna pattern for MIMO, without any conducting material being disposed close by.

By making a large number of slots in an outer conductor of the elongated pipe or cable, an electromagnetic field or a smart antenna array can be created, resulting in very high bitrate connections to multiple users or client devices. Besides, such an antenna arrangement is easy and cheap to produce.

By using a mechanically rigid conductive material as the conductive body, the antenna arrangement as disclosed by the present disclosure is robust and does not bend or change geometry easily.

In an example of the present disclosure, the plurality of slots are arranged in at least one row along the longitudinal direction of the conductive body, the feeding structure comprises a plurality of integrated circuits, ICs, disposed on at least one elongated printed circuit board, PCB, ICs on each PCB arranged to feed a number of antenna elements arranged in one row.

As the conductive pipe is a three-dimensional structure, the slots may be arranged in more than one row, slots in each row can be conveniently excited by an elongated PCB having ICs disposed on, with each IC exciting a slot. Such a structure allows more flexibility in having antenna patterns in three dimensions, in comparison to strip antenna's in two dimensions.

In an example of the present disclosure, the antenna arrangement further comprises an inner electrical conductor arranged at a centre of the conductive body.

The inner electrical conductor together with the pipe shaped conductive body form a coaxial structure, which helps to improve the propagation of signals along the conductive body towards the ICs on the feeding PCB.

In an example of the present disclosure, the plurality of slots are formed in a shape suitable for propagation of electromagnetic waves from the antenna elements in a directional way.

As can be contemplated by those skilled in the art, the slots may be formed in various shapes suitable for generating the desired antenna patterns, depending on specific applications of the antenna arrangement.

In an example of the present disclosure, the shape comprises at least one of an elongated slot extending along the longitudinal direction, a circumferential direction or a helices direction of the conductive body and a X-shaped slot.

As can be contemplated by those skilled in the art, an elongated slot is typically used in slot antennas, which may be arranged in various directions along the conductive body, such as along its longitudinal or circumferential direction or even in a helices direction. An alternative shape is a cross-shaped or X-shaped slot. These slots can be formed easily and does not require additional or extra manufacture techniques.

In an example of the present disclosure, the antenna elements are individually controllable.

In particular, the antenna elements are individually activatable or de-activatable. By selectively switching on or off the IC exciting each slot, the antenna elements may be activated individually or in group to create different MIMO groups which will produce different patterns as needed.

In an example of the present disclosure, the antenna arrangement further comprises at least one additional device, the at least one additional device is disposed on the feeding structure or on an external surface of the conductive body, in particular, the at least one additional device is a lighting device.

The structure of the antenna arrangement as proposed by the present disclosure enables its convenient deployment at locations where the deployment of antenna masts is difficult or infeasible. It is noticed that such locations in many cases also have other needs such as providing sufficient lighting and monitoring or controlling the volume of people. Combining an additional device, such as a lighting device, with the antenna arrangement, by disposing or arranging the additional device on the feeding structure of the antenna arrangement directly, allows such needs to be conveniently addressed with a single physical structure, without overly cluttering or deteriorating the overall environment having the antenna arrangement and the addition device deployed therein.

In an example of the present disclosure, the at least one additional device is respectively disposed next to a feeding element in proximity to one of the plurality of slots.

To avoid hampering normal functioning of an additional device, it may be disposed next to a feeding element, that is, an IC, on the feeding structure. It therefore ensures that the additional device is close or in proximity to one of the slots, thereby allowing its performance to remain unobstructed.

In an example of the present disclosure, at least one opening with sealed transparent window is further formed in the conductive body, the at least one additional device is respectively disposed in proximity to one of the at least one opening.

As an alternative, a further opening may be used for an additional device specifically. In this case, the additional device is disposed in proximity to the further opening.

In particular, when the additional device is a lighting device, the further opening may be a sealed transparent window which allows light emitted by the lighting device to be transmitted out of the conductive body easily.

Additionally, the slots forming the antenna elements may be sealed as well.

Practically, the "seal" has very little influence on the electromagnetic behaviour of the antenna function. The seal is meant to be optically transparent for lighting purposes if needed, that is, when the at least one additional device is a lighting device.

The relative permittivity or dielectric constant of a material of the "seal" is the only influencing factor for the performance of the antenna arrangement. Applying such a seal might require making the slots functioning as the antenna element a bit smaller or bigger compared to an opening in air. The reason for this is the fact that the speed of EM waves though certain material is different and therefore should be adapted to match the desired resonant frequency, including its matching impedance.

In an example of the present disclosure, the sealed transparent window is arranged to act as an optical element.

Specifically, the sealed transparent window may additionally act optically as diffusors, collimators, or lens(es) dependent on the required optical effect. Beneficially these openings are directed in one direction so that a light designer can place the antenna arrangement appropriately, in order to achieve a certain light design. When an optical foil comprising microlenses is used to seal the window, the sealed transparent window may function as a lens structure with multiple lenses.

In an example of the present disclosure, the antenna arrangement further comprises a shielding cover surrounding the conductive body.

The shielding cover functions to protect the antenna structure as well as the feeding structure, for example against severe weather and environment conditions.

In an example of the present disclosure, the shielding cover is made of a thermally conductive and optically transparent or semi-transparent material.

It thereby helps to get rid of heat generated by for example the ICs of the antenna arrangement and the lighting device and to facilitate emission of light to surroundings.

Optically transparent or semi-transparent material normally has less optimum heat conducting properties but if the temperature stays within specification like for instance 85 degrees Celsius, the usage of this material is fine.

As a specific example of the present disclosure, the shielding cover is optically transparent or semi-transparent at least at locations of slot(s) and opening(s) having the at least one additional device disposed in proximity thereto.

In an example of the present disclosure, the shielding cover comprises at least one optical waveguide excited by the at least one of the opening.

The optical waveguide may be used to display nice patterns, text of shapes on the outer surface of the conductive body. In this way the antenna function stays intact and at the same time the optically transparent opening for the additional device is only present to excite the optical waveguides.

In an example of the present disclosure, the optical waveguide comprises phosphor material excitable by a wavelength produced by the at least one additional device.

The additional device being for example an LED may be selected to emit a wavelength exciting the phosphor which may glow in a different wavelength. This can make the whole pipe seem to glow.

In an example of the present disclosure, the antenna arrangement further comprises one of a sensor and an actuator.

The actuator may be for example a vibration motor or a piezo device. These devices may be used to facilitate good maintenance of the antenna arrangement by for example removing snow from the pipe shaped conductive body in winter times by literally shaking it off. The vibration effect might also be useful to get rid of birds. This might prevent having bird excrement on the pipe because as long as there are no birds on the cable, the chance of having bird excrement on the cable is low. Such vibration actuators may also produce audible signals and/or be used for public address speakers.

The sensor may comprise a presence sensor, a light sensor, a microphone and the like. The sensors may function to monitor a (semi-) public area, to gather data, or to control the active antenna array and/or light output based on the sensor data.

In an example of the present disclosure, the antenna arrangement further comprises a sealed housing for accommodating one or more electronic devices for communication.

Such electronic devices allow a mesh network to be formed without any further data connection.

The above mentioned and other features and advantages of the disclosure will be best understood from the following description referring to the attached drawings. In the drawings, like reference numerals denote identical parts or parts performing an identical or comparable function or operation.

DETAILED DESCRIPTION

Embodiments contemplated by the present disclosure will now be described in more detail with reference to the accompanying drawings. The disclosed subject matter should not be construed as limited to only the embodiments set forth herein. Rather, the illustrated embodiments are provided by way of example to convey the scope of the subject matter to those skilled in the art.

Figure 1:
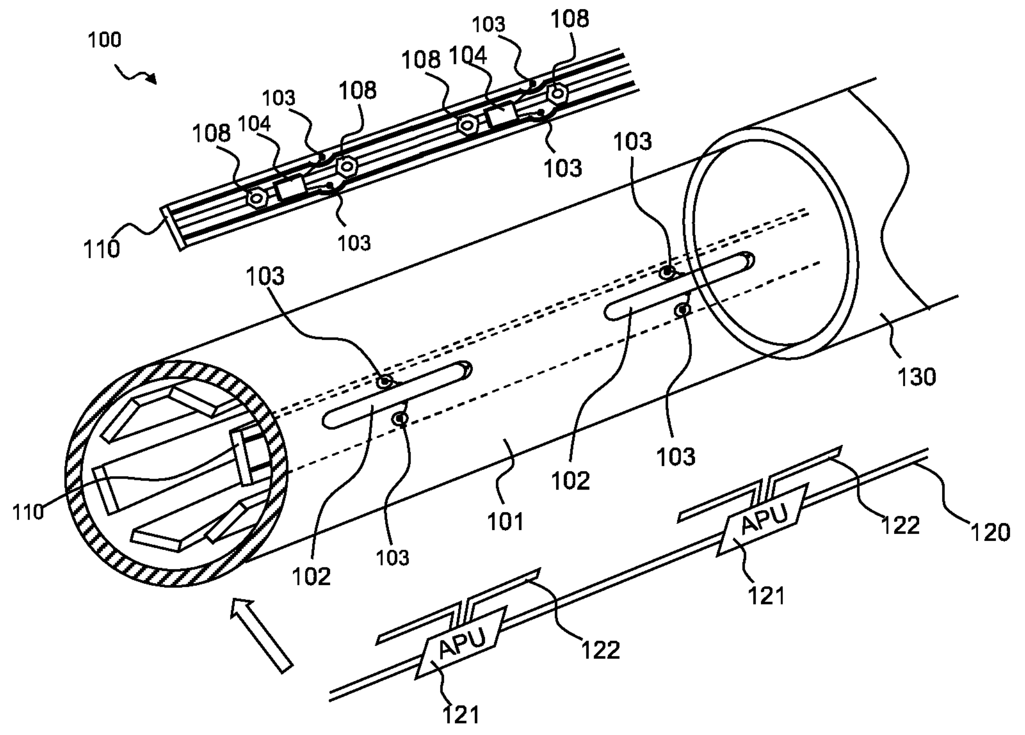
FIG. 1 schematically illustrates an antenna arrangement in accordance with the present disclosure.

FIG. 1 schematically illustrates an antenna arrangement 100 in accordance with the present disclosure.

The antenna arrangement 100 comprises an elongated pipe shaped electrically conductive body, such as an outer conductor 101. A plurality of slots or slits 102 are formed in the conductive body 101 and electrically excited by point sources 103 disposed on a feeding structure 110 arranged within the conductive body 101.

The slots 102 in this example have an elongated shape extending along a longitudinal direction of the conductive body 101. A number of slots 102 forms a slot antenna array and are repeated along the longitudinal direction of the conductive body 101.

As an example, signals required to excite the slot antenna array are generated by ICs 104 which are mounted on for example a printed circuit board, PCB, 110 functioning as the feeding structure which is disposed in the pipe.

Each slot 102 when being excited by a pair of sources 103 acts as a slot antenna which radiates electromagnetic energy. The antenna array may be schematically illustrated to have an equivalent mechanical structure 120 as shown in FIG. 1, comprising a signal generator unit 121 with antennas 122.

The slots 102 are illustrated as narrow and elongate slits each in itself extending along a longitudinal direction of the conductive body 101. The array formed by a number of slots are arranged in a row, which also extends along the longitudinal direction of the conductive body 101.

Only two slots arranged in one row are illustrated in FIG. 1, however, it can be contemplated by those skilled in the art that a plurality of slots may be arranged into a plurality of rows surrounding the out surface of the conductive body 101. Each row comprises a number of slots 102, and has a corresponding feeding structure in the form of the PCB 110 for exciting the slots on that row.

In the example of FIG. 1, six PCBs 110 are illustrated, which are used to provide excitation to six rows of slots 102 (only one row is illustrated in FIG. 1). This solution is based on a realistic, cost effective solution, but any number of PCBs or even a pipe shaped PCB (or a flexible PCB or foil) may be made to fit in the conductive body 101, depending on reliability, cost, ease of production or any other relevant reason.

As an example, individual antenna structures formed by a slot and the corresponding excitation may be controlled or addressed independently, in case single antennas are required along the conductive body 101, leaving many antenna's unused for that moment in time. In this case, the MIMO function can partially or completely be disabled. Because there are so many antennas along the conductive body 101, one antenna can be selected based on required propagation properties towards a client.

In an example, a group of antennas along the conductive body 101 can be activated creating individual MIMO groups.

Figure 2:
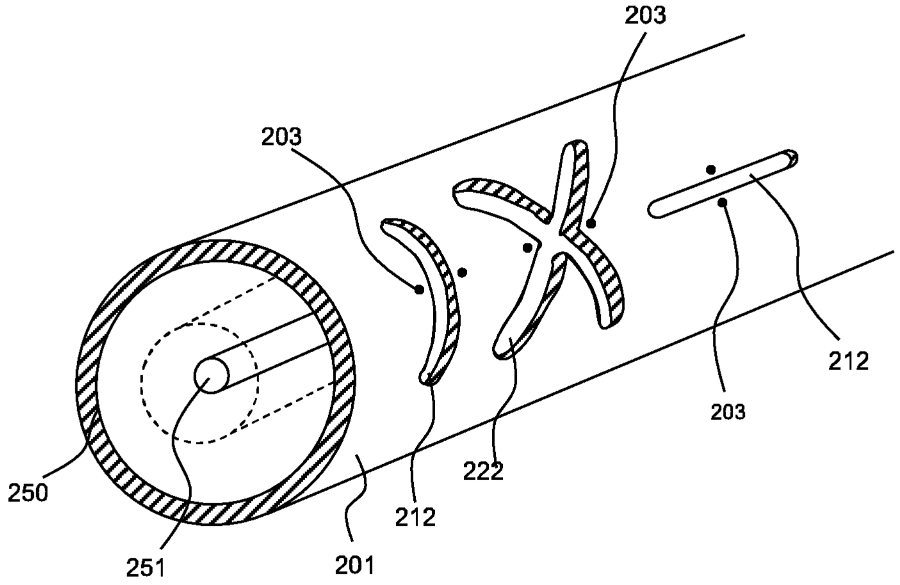
FIG. 2 schematically illustrates alternative slot shapes in accordance with the present disclosure.

Referring to FIG. 2, it can be contemplated by those skilled in the art that the slots may adopt any other shape, which may help to improve the behaviour of the propagation of the electromagnetic signals and excited by points.

In FIG. 2, an alternative slot 212 is illustrated to have an elongated shape and oriented along a circumferential direction of the conductive body and having excitations 203. It can be contemplated that the slot 212 may also be oriented inclined or in a helices direction relative to the conductive body.

Another alternative slot 222 is illustrated to have an X or cross shape. A slot 212 having the same orientation as the slots 102 is also illustrated in FIG. 2.

Additionally, an inner conductor 251 may be disposed inside the conductive body 201, forming a coaxial structure 250 which is helpful in improving the propagation of signals along the pipe towards the ICs 104, like drawn on the PCBs 110 in FIG. 1.

Referring back to FIG. 1, a shielding cover or protecting layer 130 may be disposed around or surrounding the conductive body 101.

Furthermore, one or more additional devices may be disposed on the PCB 110. It is illustrated in FIG. 1 that LEDs lighting devices 108 are disposed on the PCB 110 next to the ICs 104 and the excitation sources 103. The LED lighting devices 108 may be mounted as naked chips (Flip Chip) like the antenna driver ICs 104.

As a result, antenna and light emission functions or other functions are combined into the antenna arrangements 100. As long as a material of the shielding or protecting cover is optically transparent at the location of the slots having LEDs 108 disposed next to them, light emitted by the LEDs 108 will be able to be transmitted out of the conductive body 101.

Alternatively, additionally dedicated openings with sealed transparent windows may be arranged just for the lighting application. These windows may additionally act as an optical element such as diffusors, collimators, or lenses dependent on the required optical effect.

It is especially beneficial if these openings for emitting light are directed in one direction so that a light designer can orient the antenna arrangement 100 with lighting devices as needed in order to achieve a certain light design.

Alternatively, the lighting devices 108 may be mounted on an outer surface of the conductive body 101, such that they may light up the protecting cover 130 that may have specific optical properties, e.g. a lens array to collimate the light or simply diffusing the light.

Preferably, properties of the material of the shielding cover 130 are thermally conductive and optically transparent in order to get rid of the generated heat and emit the light to surroundings.

For most applications, it is beneficial making the shielding cover conductive and having it grounded properly, such that it can withstand lightning strokes.

As an example, the whole outer shielding cover 130 may be made of optically transparent or translucent material if heat dissipation in combination with cooling by surroundings allow this. Compared to electrically conducting material like for instance copper, iron, gold used for the conductive pipe 101, optically transparent material normally has less optimum heat conducting properties but if the temperature stays within specification like for instance 85 degrees Celsius, the usage of this material is fine.

As an example, the outer shielding cover 130 may comprise optical wave guides, making nice patterns, text of shapes on the outer surface of the conductive body 101 emitting light. In this way the antenna function stays intact and at the same time the optically transparent opening is only present to excite the optical waveguides.

As an example, the waveguides may have phosphor material embedded therein, for example by doping. The LEDs 108 are then selected to emit a wavelength exciting the phosphor which may glow in a different wavelength. This allows to make the whole pipe seem to glow.

As an example, structures containing optical wave guides can be attached to the conductive body 101 on locations where the slots are located. In this way signs or flags and other objects which are optically transparent can light up because of the built-in optical wave guides.

Furthermore, the PCB 110 may be equipped with further sensors or actuators. As an example, vibration motors or piezo devices or speakers (not shown) may be disposed on the PCB 110, such that undesirable material such as snow may be removed from the conductive body by literally shaking it off. As heat dissipation is present, the snow may actually melt quite fast. However if it does not melt fast enough, then the snow can be removed mechanically in this way.

The vibration effect might also be useful to get rid of birds. This might prevent having bird excrement on the conductive body because as long as there are no birds on the cable, the chance of having bird excrement on the cable is low. Such vibration actuators may also be able producing audible signals and/or be used for public address speakers.

It can be contemplated by those skilled in the art that an array of sensors may be integrated in the structure. For instance, sensors could be positioned on the PCB 110, and be aligned with the antenna slots, such that they can sense environmental properties.

For instance, the sensors may comprise presence sensors, light sensors, microphones and so on. The sensors may be used to detect people presence, ambient light conditions, noise levels etc. The purpose of the sensor infrastructure could either be to monitor a (semi-)public area, to gather data, or to control the active antenna array and/or light output based on the sensor data.

The antenna arrangement 100 as illustrated in FIG. 1 may be mounted in a way which makes its rotation possible. By rotating the antenna arrangement 100 along its longitudinal axis, the antenna slots are moved in the rotating direction resulting in a different propagation path for all antennas.

In a further developed example, the antenna arrangement 100 may carry sealed housings for accommodating electronics for communication and networking. The electronics may comprise RF management electronics such as radios using the antenna array for wireless communication and/or an interface towards a backbone network, such as Ethernet or Power over Ethernet, PoE. In this way, such a system can be installed by only connecting power. A meshed network can be arranged without any further data connection.

As still another example, the antenna arrangement 100 may be used as carrier supporting a streetlight at midpoint between two light poles. For such an embodiment the antenna arrangement 100 has to be able to withstand the pull forces in the carrier cable.

In a further developed example, the antenna arrangement 100 may also integrate power conductors in order to supply power to such a streetlight. By combining cable lighting and the antenna arrangement 100, connectivity can easily be brought to open spaces where huge crowds could meet.

Such flexible antenna arrangement 100 integrating lighting and offering connectivity may also be interesting for events (e.g. festivals or concerts). For instance, the antenna arrangement 100 may be disposed high above an audience or for guiding the way towards a specific event. In the latter case, the light emitted by the additional lighting devices may have a signage purpose, for instance, a pixelated light effect indicating a recommended walking speed, or illuminated arrows indicating the direction towards the event.

The antenna arrangement 100 may also be a module of street lighting pole, for instance, as (part of) a vertical pole, or as an arm or bracket which extends from a top of the streetlight pole. In that case the pipe could either comprise the street light source, or it could provide the mechanical and electrical connection towards a separate light source.

The present disclosure is not limited to the examples as disclosed above, and can be modified and enhanced by those skilled in the art beyond the scope of the present disclosure as disclosed in the appended claims without having to apply inventive skills and for use in any data communication, data exchange and data processing environment, system or network.

The invention claimed is:

1. An antenna arrangement comprising:

an elongated pipe shaped electrically conductive body;

a plurality of slots formed in the conductive body and arranged to act as an antenna array comprising a plurality of antenna elements, each antenna element comprising a slot, the plurality of antenna elements of the antenna array overall distributed along a longitudinal direction of the conductive body;

a plurality of feeding structures disposed within the conductive body, each feeding structure of the plurality comprising a plurality of point sources and a plurality of feeding elements each arranged to excite two or more antenna elements of the antenna array via one or more of the plurality of point sources; and at least one additional device disposed on the feeding structure; wherein the at least one additional device is a lighting device for illumination.

2. The antenna arrangement according to claim 1, wherein the plurality of slots are arranged in at least one row along the longitudinal direction of the conductive body, at least one of the plurality of feeding structures comprises a plurality of integrated circuits, ICs, disposed on at least one elongated printed circuit board, PCB, ICs on each PCB arranged to feed a number of antenna elements arranged in one row.

3. The antenna arrangement according to claim 1, further comprising an inner electrical conductor arranged at a centre of the conductive body.

4. The antenna arrangement according to claim 1, wherein the plurality of slots are formed in a shape suitable for propagation of electromagnetic waves from the antenna elements in a directional way.

5. The antenna arrangement according to claim 4, wherein the shape comprises at least one of an elongated slot extending along the longitudinal direction, a circumferential direction or a helices direction of the conductive body and a X-shaped slot.

6. The antenna arrangement according to claim 1, wherein the antenna elements are individually controllable.

7. The antenna arrangement according to claim 1, wherein the at least one additional device is respectively disposed next to a feeding element in proximity to one of the plurality of slots.

8. The antenna arrangement according to claim 1, wherein at least one opening with a sealed transparent window is further formed in the conductive body, the at least one additional device is respectively disposed in proximity to one of the at least one opening.

9. The antenna arrangement according to claim 8, wherein the sealed transparent window is arranged to act as an optical element.

10. The antenna arrangement according to claim 1, further comprising a shielding cover surrounding the conductive body.

11. The antenna arrangement according to claim 10, wherein the shielding cover is made of a thermally conductive and optically transparent or semi-transparent material.

12. The antenna arrangement according to claim 10, wherein the shielding cover is optically transparent or semi-transparent at least at locations of slot(s) and opening(s) having the at least one additional device disposed in proximity thereto.

13. The antenna arrangement according to claim 10, wherein at least one optically transparent opening is further formed in the conductive body, wherein the shielding cover comprises at least one optical waveguide excited by the at least one of the optically transparent opening.

14. The antenna arrangement according to claim 13, wherein the optical waveguide comprises phosphor material excitable by a wavelength produced by the at least on additional device.

15. The antenna arrangement according to claim 1, further comprising at least one of a sensor for controlling the antenna array and an actuator for facilitating maintenance of the antenna arrangement.

16. The antenna arrangement according to claim 1, wherein the plurality of slots formed in the conductive body are arranged into a plurality of rows along the longitudinal direction of the conductive body, wherein each of the plurality of feeding structures is arranged to excite the antennae elements corresponding to one of the plurality of rows.

* * * * *